United States Patent [19]

Schlosser et al.

[11] Patent Number: 4,498,452
[45] Date of Patent: Feb. 12, 1985

[54] KETTLE WITH ASH CATCHER

[75] Inventors: Erich J. Schlosser, Lindenhurst; George Stephen, Jr., Palatine, both of Ill.

[73] Assignee: Weber-Stephen Products Co., Palatine, Ill.

[21] Appl. No.: 390,242

[22] Filed: Jun. 21, 1982

[51] Int. Cl.³ .............................. F24C 1/16
[52] U.S. Cl. .................. 126/9 R; 126/25 R; 248/152; 108/101
[58] Field of Search ............ 126/9 R, 9 A, 9 B, 25 R, 126/30, 29, 38, 55, 26, 225 R, 59; D7/332, 334, 335, 336, 337; 248/150, 151, 152, 529; 108/101, 156

[56] References Cited

U.S. PATENT DOCUMENTS

| | | | |
|---|---|---|---|
| 844,583 | 2/1907 | Dixon | 126/9 B |
| 861,093 | 7/1907 | Cordley | 248/150 |
| 931,557 | 10/1908 | Barney | 126/9 B |
| 955,140 | 4/1910 | Cronk | 126/30 |
| 1,467,815 | 9/1923 | Roemer | 126/9 B |
| 1,630,925 | 5/1927 | Clover | 108/101 |
| 1,943,269 | 1/1934 | Holden | 248/529 X |
| 2,171,228 | 8/1939 | Schultz et al. | 248/529 X |
| 2,487,606 | 11/1949 | Smith | 126/25 R |
| 2,508,963 | 5/1950 | Mote | 126/30 |
| 2,635,024 | 4/1953 | Sanford | 108/101 X |
| 2,860,624 | 11/1958 | Eddy | 126/9 B |
| 2,875,968 | 3/1959 | Ekda | 248/529 X |
| 3,306,281 | 2/1967 | Hoebel | 126/25 R |
| 3,538,906 | 11/1970 | Heraty et al. | 126/25 R |
| 3,828,759 | 8/1974 | Cooper | 126/25 R |
| 4,026,266 | 5/1977 | Cremer | 126/9 B |

FOREIGN PATENT DOCUMENTS

| | | | |
|---|---|---|---|
| 641776 | 2/1937 | Fed. Rep. of Germany | 108/101 |
| 615220 | 1/1949 | United Kingdom | 108/156 |

Primary Examiner—Larry Jones
Assistant Examiner—Carl D. Price
Attorney, Agent, or Firm—Robert E. Wagner; Ralph R. Rath

[57] ABSTRACT

A cooking apparatus includes a vessel or bowl that has a plurality of openings circumferentially-spaced around a central vertical axis with the support structure for the bowl including a plurality of identical legs and an ash catcher. The ash catcher is designed such that one end portion of each leg is received into a slot and the other end portion is received into the opening and receives wing nuts so that the unit can be assembled without the use of any tools.

4 Claims, 5 Drawing Figures

U.S. Patent     Feb. 12, 1985     4,498,452
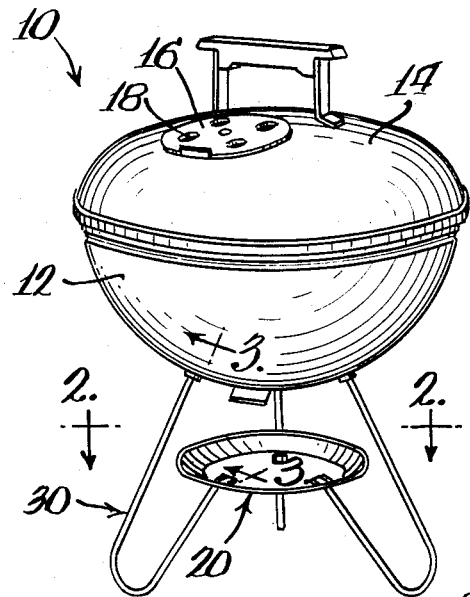
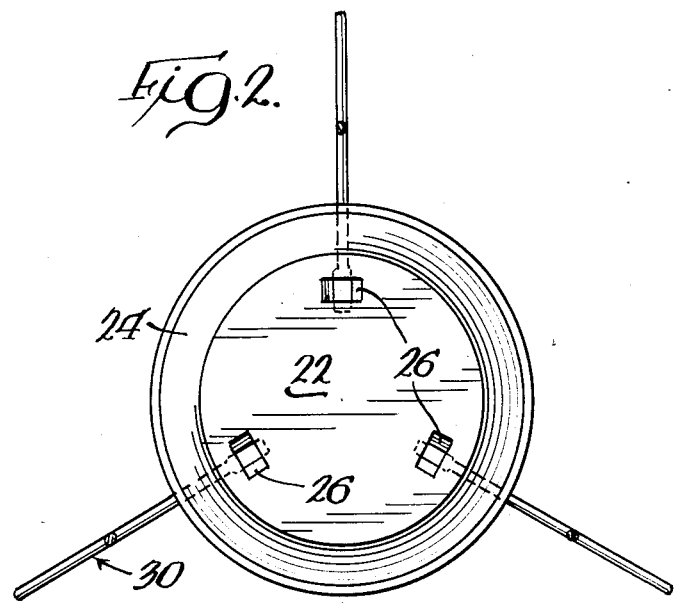
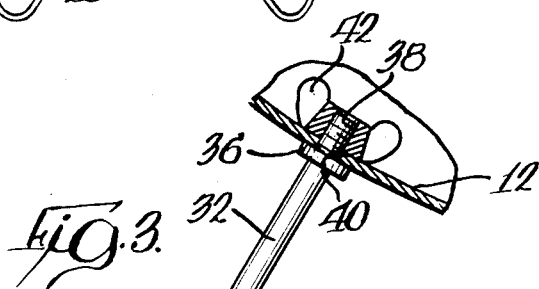
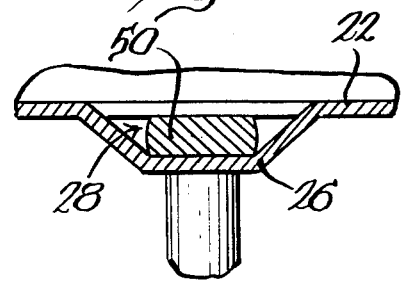
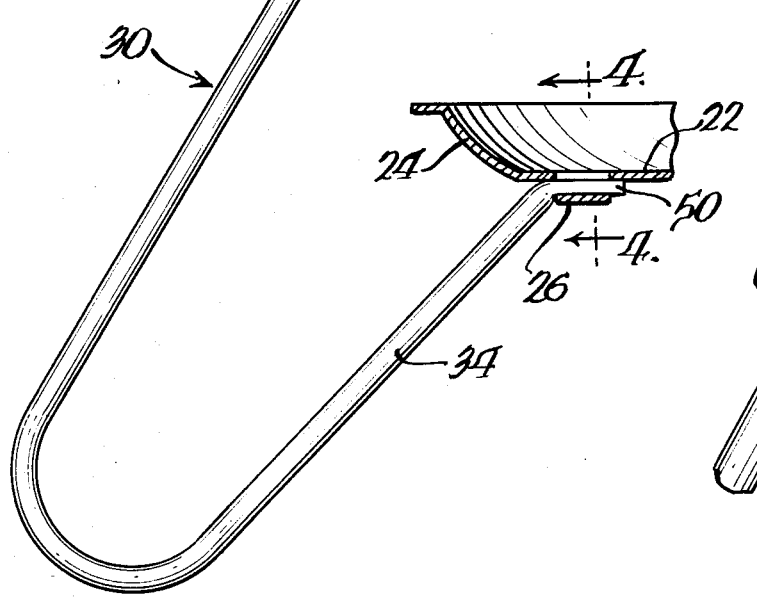
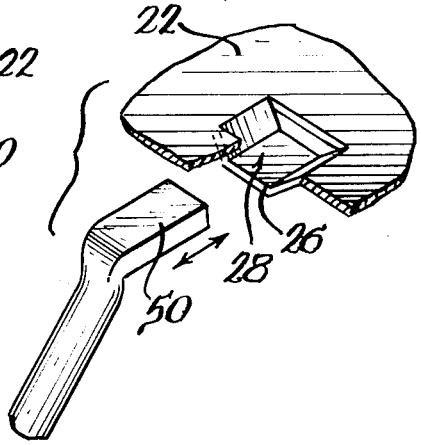

KETTLE WITH ASH CATCHER

DESCRIPTION

1. Technical Field

The present invention relates generally to a cooking apparatus and, more particularly, to a portable outdoor grill that can easily be assembled and disassembled.

2. Background Prior Art

Outdoor cooking has become more and more popular in this country and various types of cooking apparatus have been developed for this purpose. One such type of cooking apparatus is sold by the Assignee of the present invention and consists of a generally semi-herispherical vessel that has a generally semi-hemispherical cover with the cooking vessel having a grill spaced above a grid which supports the charcoal. This cooking vessel is supported by a patented support system, such as disclosed in U.S. Pat. No. 3,538,906.

The cooking apparatus described above is very portable in nature and can be easily moved about since it is supported on wheels. This cooking apparatus has been manufactured for a number of years and is easy to assemble in a short period of time.

The cooking vessel or apparatus sold by the Assignee of the present invention also has openings located in the base thereof which are openable to vent the inside for cooking purposes. In its preferred form, the cooking apparatus also has an ash catcher located below the vent so that any ashes falling throught the openings are accumulated and can easily be discarded.

Because of the competitive nature of this product, manufacturers are constantly striving to reduce the costs of manufacture, while still maintaining the portability of the unit. Portability of outdoor cooking apparatus is extremely important since most purchasers like to have a unit that is sufficiently portable to be able to assemble and disassemble in a short period of time so that the unit can be transported to a picnic site and set up in a short period of time.

SUMMARY OF THE INVENTION

According to the present invention, a cooking apparatus has been developed which can be assembled in a short period of time without any special instructions and without the use of any tools other than the assembler's hands.

More specifically, the present invention includes a generally semi-hemispherical cooking vessel that has a plurality of circumferentially-spaced openings in the body thereof centered around a central vertical axis. A plurality of legs, equal in number to the openings, all are identical in construction and are generally U-shaped in configuration having a fastening means at one end adapted to be received into the openings in the cooking vessel and having an opposite end attached to an ash catcher located below the cooking vessel. The ash catcher has deformed portions defining a plurality of generally horizontal slots that are adapted to receive the opposite ends of the legs which therefor support the ash catcher, as well as the cooking vessel. In the specific embodiment illustrated, the ends of the legs that are received into openings in the vessel have threaded portions which receive wing nuts, while the opposite ends have generally rectangular portions that are adapted to slide into generally horizontal slots. In assembling the unit, the rectangular ends of the legs are first slid into the slots in the ash catcher and the opposite ends are then inserted into the openings in the vessel and the wings nuts secured thereto.

BRIEF DESCRIPTION OF SEVERAL VIEWS OF DRAWINGS

FIG. 1 is a side elevational view of the cooking vessel constructed in accordance with the present invention;

FIG. 2 is a cross-sectional view, as viewed generally along line 2—2 of FIG. 1;

FIG. 3 is a cross-sectional view, as viewed along line 3—3 of FIG. 1;

FIG. 4 is an enlarged cross-sectional view, as viewed along line 4—4 of FIG. 3; and, FIG. 5 is an isometric view showing one of the steps performed in assembling the cooking apparatus of the present invention.

DETAILED DESCRIPTION

While this invention is susceptible of embodiment in many different forms, there is shown in the drawings and will herein be described in detail a preferred embodiment of the invention with the understanding that the present disclosure is to be considered as an exemplification of the principles of the invention and is not intended to limit the broad aspect of the invention to the embodiment illustrated.

FIG. 1 of the drawings discloses the cooking apparatus of the present invention, generally designated by reference numeral 10. The cooking apparatus 10 includes a semi-hemispherical cooking vessel 12 which is open at the top and has a cover 14 supported thereon. Cover 14 has a plurality of vent openings, not shown, adapted to be covered and uncovered by a vent closure 16 having a plurality of openings 18 which are alignable with the openings in the cover 14.

The hemispherical vessel 12 also has vent openings (not shown) adjacent the bottom and covered by a vent closure similar to the closure 16. The vent opening in the bottom of the vessel or bowl 12 not only provides ventilation for the interior, but also allows for ashes from the charcoal to drop through the vent openings. Of course, it is desirable to accumulate the ashes rather than have them drop onto the support surface, such as a patio or deck.

According to the present invention, an ash catcher has been developed which forms an integral part of the support mechanism for the cooking vessel 12. The ash catcher and support are designed such that they can easily be assembled without the use of any special tools or intricate instructions.

According to the present invention, the ash catcher 20 consists of a main body 22 that has an upwardly-directed periphery 24 to define a dish-shaped member for receiving the ashes falling through the openings in the lower vent of the cooking vessel 12. The main body has a plurality of deformed portions 26 deformed downwardly and away from the main cooking vessel 12 to define a plurality of elongated horizontal slots 28, three being illustrated in the drawings, the purpose of which will be apparent later.

The support structure for bowl 12 also includes three identical legs 30 interposes between ash catcher 20 and bowl 12 to define the remainder of the support. Each leg 30 is generally U-shaped in configuration and has a first leg portion 32 and a second leg portion 34, both of which are formed preferably from a circular rod. Leg 32 preferably has a washer or other enlarged portion 36 spaced inwardly a slight distance from the free end thereof, with the remainder of the rod being threaded at 38 and received into an opening 40 in bowl or vessel 12. A wing nut 42 is adapted to be received on the threaded end portion 38 of the rod to secure the leg to the bowl 12.

The opposite end of leg portion 34 has an angularly-offset portion 50 which is offset from the axis of the rod and is preferably flattened to produce a rectangular configuration, as illustrated in FIGS. 4 and 5. Rectangular end portion 50 is adapted to be received into a horizontal slot 28.

In assembling the cooker 10, it is only necessary to insert the rectangular end portions 50 into the respective slots 28 and then manipulate the threaded end portions 38 into openings 40 and secure the wing nuts 42 thereto. The simplicity of the construction substantially reduces the cost of manufacture and simplifies the assembly. In fact, it is unnecessary to have any instructions with the cooking apparatus 10 of the present invention.

Since the three legs are all identical in construction, the inventory of parts necessary for manufacturing the cooking apparatus is reduced and all of the components for the support structure can easily be mass-produced at a minimum cost.

I claim:

1. Cooking apparatus comprising a hemispherical cooking vessel having a generally vertical center axis with a plurality of spaced openings and an ash catcher located below said cooking vessel with a plurality of legs supporting said cooking vessel and ash catcher, each of said legs having first and second ends and being generally U-shaped between said ends and having a threaded portion on said first end received into one of said openings in said cooking vessel with a fastener received on said threaded portion, said legs being circumferentially-spaced and extending radially outwardly to form lower support surfaces each of said legs having portions extending inwardly and upwardly with said second ends connected to said ash catcher, said ash catcher having a plurality of horizontal slots respectively receiving said second ends of said legs through a sliding connection whereby said cooking apparatus can be assembled without any tools and bases of said U-shaped legs define said lower support surfaces with said cooking vessel supported on said first ends of said legs and said ash catcher supported on said second ends of said legs and whereby said ash catcher forms a part of the support for said cooking vessel.

2. Cooking apparatus as defined in claim 1 in which said legs are generally circular rods with said opposite ends being angularly offset from the axis of said rods.

3. Cooking apparatus as defined in claim 2 in which said angularly-offset opposite ends of said rods are flattened to produce substantially rectangular ends received into said slots.

4. Cooking apparatus as defined in claim 1 in which said ash catcher has portions deformed from the main body thereof to produce said slots.

* * * * *